(12) United States Patent
Markowski et al.

(10) Patent No.: US 8,556,213 B2
(45) Date of Patent: Oct. 15, 2013

(54) STRUCTURAL FRAME MADE OF A COMPOSITE MATERIAL AND AIRCRAFT FUSELAGE COMPRISING SUCH A FRAME

(75) Inventors: Anais Markowski, Toulouse (FR); Eric Bouchet, Aussonne (FR); Denis Soula, Toulouse (FR); Marie Elduayen, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 567 days.

(21) Appl. No.: 12/676,725

(22) PCT Filed: Sep. 4, 2008

(86) PCT No.: PCT/EP2008/061703
§ 371 (c)(1),
(2), (4) Date: Aug. 10, 2010

(87) PCT Pub. No.: WO2009/030731
PCT Pub. Date: Mar. 12, 2009

(65) Prior Publication Data
US 2010/0308165 A1 Dec. 9, 2010

(30) Foreign Application Priority Data
Sep. 7, 2007 (FR) .................. 07 57431

(51) Int. Cl.
*B64C 1/00* (2006.01)
(52) U.S. Cl.
USPC .................. 244/119; 244/117 R; 264/258
(58) Field of Classification Search
USPC .................. 244/117 R, 119, 133
See application file for complete search history.

(56) References Cited

U.S. PATENT DOCUMENTS

| 5,171,510 A | 12/1992 | Barquet et al. |
| 7,138,167 B2 | 11/2006 | Sakonjo et al. |
| 7,153,096 B2 * | 12/2006 | Thompson et al. ........... 415/200 |
| 7,544,261 B1 | 6/2009 | Nogueroles Vines et al. |
| 2005/0042410 A1 * | 2/2005 | Sakonjo et al. ............ 428/66.6 |
| 2006/0048890 A1 | 3/2006 | Sato et al. |
| 2008/0054122 A1 | 3/2008 | Bold |

FOREIGN PATENT DOCUMENTS

| EP | 1 972 426 A1 | 9/2008 |
| WO | WO 2004/016844 A1 | 2/2004 |
| WO | WO 2005/115839 A1 | 12/2005 |
| WO | WO 2007/074179 A1 | 7/2007 |

OTHER PUBLICATIONS

French Search Report issued Apr. 23, 2008 in French Application No. 0757431.

* cited by examiner

*Primary Examiner* — Philip J Bonzell
*Assistant Examiner* — Timothy Schwarz
(74) *Attorney, Agent, or Firm* — Oblon, Spivak, McClelland, Maier & Neustadt, L.L.P.

(57) ABSTRACT

The invention relates to a structural frame made from a composite material.
The purpose of the invention is to obtain a structural frame with high mechanical performances while remaining simple in construction.
This purpose is achieved in arranging sets of single-directional fibers in the main part of the structural frame at a predetermined angle.
This system may be used as a structural frame particularly for an aircraft fuselage.

8 Claims, 4 Drawing Sheets

STRUCTURAL FRAME MADE OF A COMPOSITE MATERIAL AND AIRCRAFT FUSELAGE COMPRISING SUCH A FRAME

TECHNICAL DOMAIN

The invention relates to a structural frame made of a composite material, designed particularly to have high mechanical performances while remaining simple in construction.

One particular application of the invention is for structural frames onto which the outer skin of an aircraft fuselage is fixed.

The invention also relates to an aircraft fuselage comprising one or several frames according to the invention.

STATE OF PRIOR ART

Aircraft fuselage structures comprise structural frames uniformly distributed along the entire length of the fuselage and onto which an outer skin is fixed.

Structural frames are approximately circular in shape, for example annular or oval, or they may have two or three lobes or they may be any other shape of the same type. Their section usually comprises an approximately plane annular main part extending along a direction approximately perpendicular to the axis of the fuselage and two secondary heel- or sole-shaped parts attached to the inner and outer peripheral edges of the main part.

The function of the structural frames is to strengthen the mechanical strength of the fuselage. They resist high mechanical tensile or compression stresses, particularly in the circumferential direction, in other words along a median circumferential line around the frame. Thus, they must be designed to have a high circumferential stiffness, and therefore to have small deformation under high mechanical stresses. Furthermore, if the circumferential compression is high, these frames must have a high critical buckling stress, in other words they must not deflect in a direction perpendicular to the direction of the mechanical stresses applied. Finally, the process for manufacturing these composite material frames must include a limited number of steps so that it can be fast and economic, while being suitable for the complicated geometric shapes of the structural frame.

One means of achieving high stiffness under mechanical stresses applied in the circumferential direction is to place single-directional fibres oriented along the circumferential direction only, in the main part. However, this arrangement will result in a low critical buckling stress. The structural frame would thus be not very strong in resistance to buckling. Furthermore, in practice the arrangement of single-directional fibres along the circumferential direction making use of layers or fabrics is particularly difficult because creases must be avoided.

In order to prevent these problems related to mechanical performances and manufacturing, structural frames are usually made from single-directional fibres arranged in the main part of the frame so as to form a predetermined non-zero angle from the circumferential axis of the main part (this circumferential axis being defined as the tangent to a median circumferential line of the frame at each point along this line). This avoids the need for fibres forming an angle equal to 0 degrees from the circumferential axis.

For example, document WO2004/016844 describes a curved fibrous preform that has a plurality of reinforcing fibres arranged at a predetermined angle from the circumferential axis. The preform may have a cylindrical or plane annular shape. The main part of the fibrous preform comprises single-directional fibres alternately forming angles of −45 degrees and +45 degrees from the circumferential axis of the main part, possibly with inserted fibres oriented at 90° from this axis.

However, the orientation of fibres in the main part of the structural frame as described in this document is not fully satisfactory because the stiffness in the circumferential direction of the structural frame is not optimum.

PRESENTATION OF THE INVENTION

The main purpose of the invention is a structural frame made of a composite material, particularly for an aircraft fuselage, designed so as to have high mechanical performances while remaining simple to manufacture.

The result is obtained according to the invention using a structural frame made of a composite material, particularly for an aircraft fuselage, comprising an approximately plane main annular part, characterised in that the main part comprises first sets of single-directional fibres forming an angle between approximately 20 degrees and 40 degrees from the circumferential axis of the frame, and second sets of single-directional fibres forming an angle between approximately −40 degrees and −20 degrees from the circumferential axis of the frame, the first and second sets being uniformly distributed over the thickness of the main part.

Advantageously, the main part comprises first sets of single-directional fibres forming an angle between approximately 25 degrees and 35 degrees from the circumferential axis of the frame, and second sets of single-directional fibres forming an angle between approximately −35 degrees and −25 degrees from the circumferential axis of the frame, the first and second sets being uniformly distributed over the thickness of the main part.

Preferably, the orientations of the first and second sets of single-directional fibres are symmetric about the circumferential axis of the frame. This makes it easier to manufacture the frame according to the invention because the absolute value of the angle of all sets of single-directional fibres along the circumferential axis of the main part of the frame is the same.

Advantageously, the main part comprises first sets of single-directional fibres forming an angle equal to approximately 30 degrees from the circumferential axis of the frame, and second single-directional fibre sets forming an angle equal to approximately −30 degrees from the circumferential axis of the frame, the first and second sets being uniformly distributed over the thickness of the main part.

This orientation of sets of single-directional fibres in the main part of the frame can make the stiffness in the circumferential direction of the main part greater than the stiffness obtained for fibre orientations at +45 and minus −45 degrees from the circumferential axis of the frame, as used in prior art. Furthermore, this arrangement of sets of single-directional fibres in the main part of the frame can maintain the critical buckling stress equal to a value approximately the same as the critical buckling stress obtained for an arrangement of sets of fibres at +45 degrees and −45 degrees from the circumferential axis of the frame. Finally, the frame according to the invention is easy to manufacture because all that changes is the non-zero value of the angle formed by sets of single-directional fibres from the circumferential axis of the main part. An arrangement of fibres forming an angle equal to zero degrees from the circumferential axis of the main part and parallel to each other would make it necessary to change the manufacturing technique, which would cause technical difficulties and increase production costs.

In the preferred embodiment of the invention, the frame comprises a secondary part connected to an outer peripheral edge around the main part and extending approximately perpendicular to the main part.

Advantageously, the main part comprises third sets of single-directional fibres forming an angle equal to 90 degrees relative to the circumferential axis of the frame, arranged alternatively with the first and second sets, which increases the resistance to buckling.

Advantageously, the secondary part comprises single-directional fibres arranged approximately in the circumferential direction of the frame, which increases the stiffness of the frame in the circumferential direction.

Sets of single-directional fibres in the main part may be arranged in the form of stacks of layers or arranged in the form of fabrics.

In the preferred embodiment of the invention, a second secondary part is arranged on an inner peripheral edge of the main part and extends approximately perpendicular to the main part. The second secondary part comprises single-directional fibres arranged approximately in the circumferential direction of the frame, so as to increase the stiffness of the frame in the circumferential direction.

The invention also relates to an aircraft fuselage comprising a framework and an outer skin fixed onto the framework, the framework comprising structural frames with the characteristics that have just been described.

BRIEF DESCRIPTION OF THE DRAWINGS

We will now describe a preferred embodiment of the invention as a non-limitative example, with reference to the appended drawings in which.

DETAILED PRESENTATION OF PARTICULAR EMBODIMENTS

Figure 1:
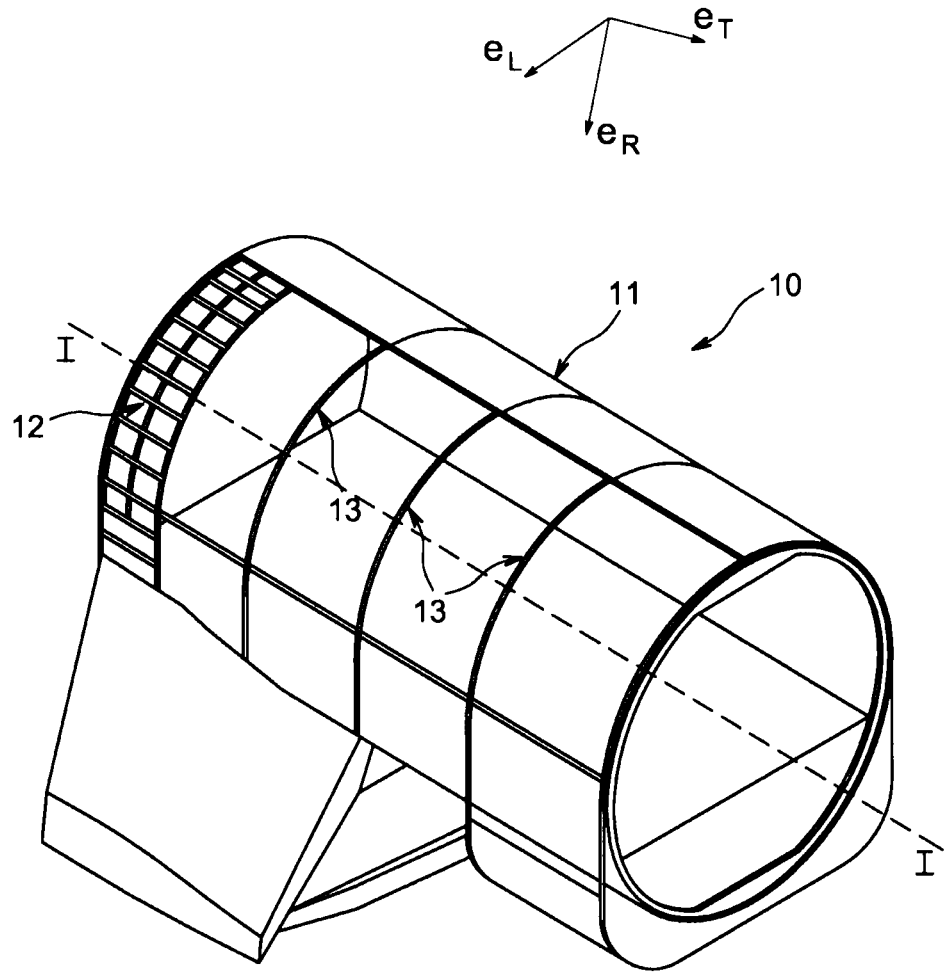
FIG. 1 shows a perspective view diagrammatically showing a segment of an aircraft fuselage including frames made according to the invention.

As shown diagrammatically in FIG. 1, the fuselage of an aircraft comprises a framework on which an outer skin 11 reinforced by spars 12 is fixed. The shape and dimensions of the fuselage 10 may vary depending on the type of aircraft, without going outside the framework of the invention.

The framework of the fuselage 10 is composed mainly of structural frames 13. The structural frames 13 are uniformly distributed along the entire length of the fuselage. Each frame is located at a section along the fuselage, perpendicular to the longitudinal axis I-I of the fuselage, and is generally approximately annular and circular or oval in shape, or it may comprise two or three lobes, or be any other similar type of shape. A direct orthogonal coordinate system using cylindrical coordinates $(e_R, e_T, e_L)$ is shown in FIG. 1. $e_R$ gives the radial direction of a point on the fuselage, $e_T$ the tangential or circumferential direction and $e_L$ is the longitudinal direction and is coincident with the longitudinal axis I-I of the fuselage.

Figure 2:
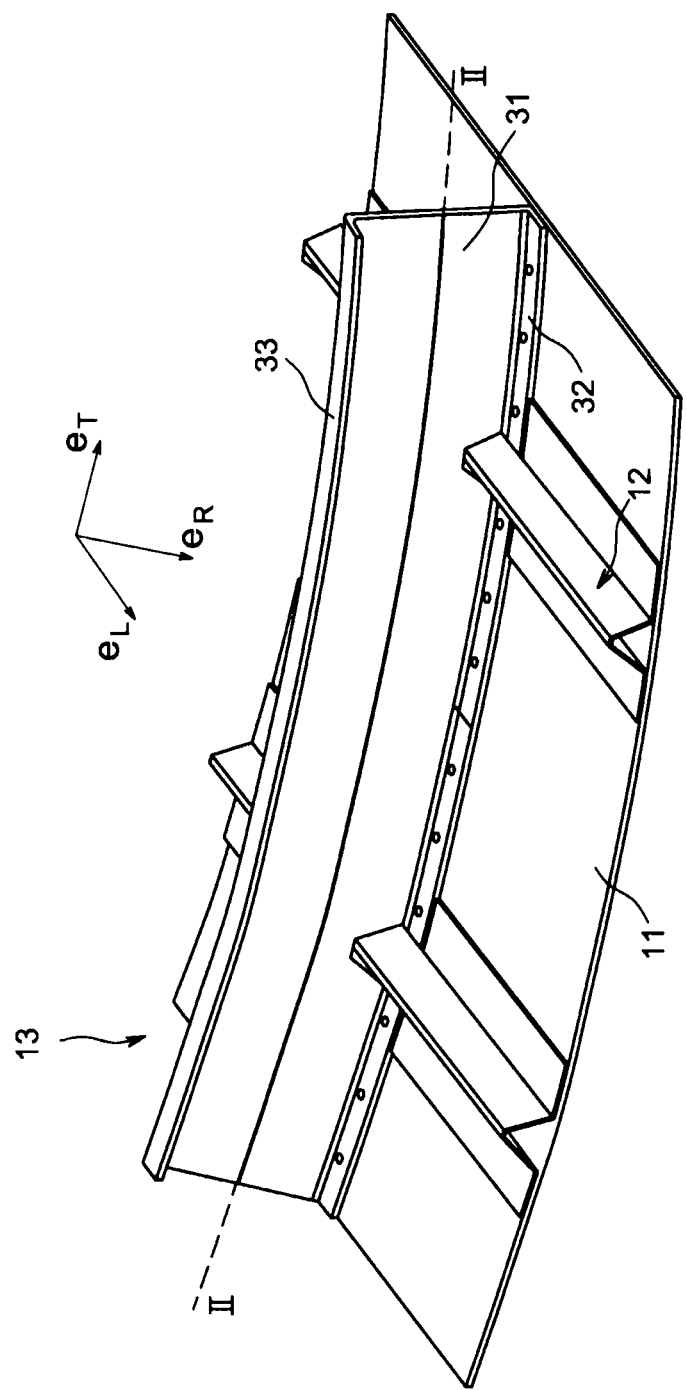
FIG. 2 is a perspective view showing a frame sector according to a preferred embodiment of the invention, onto which the outer skin of the fuselage is fixed.

FIG. 2 shows a structural frame sector 13 according to a preferred embodiment of the invention. The structural frame 13 supports the outer skin 11 of the fuselage. The outer skin 11 of the fuselage is reinforced on its inner face by spars 12 arranged parallel to the longitudinal axis I-I of the fuselage and uniformly spaced along the perimeter of the fuselage.

Figure 3:
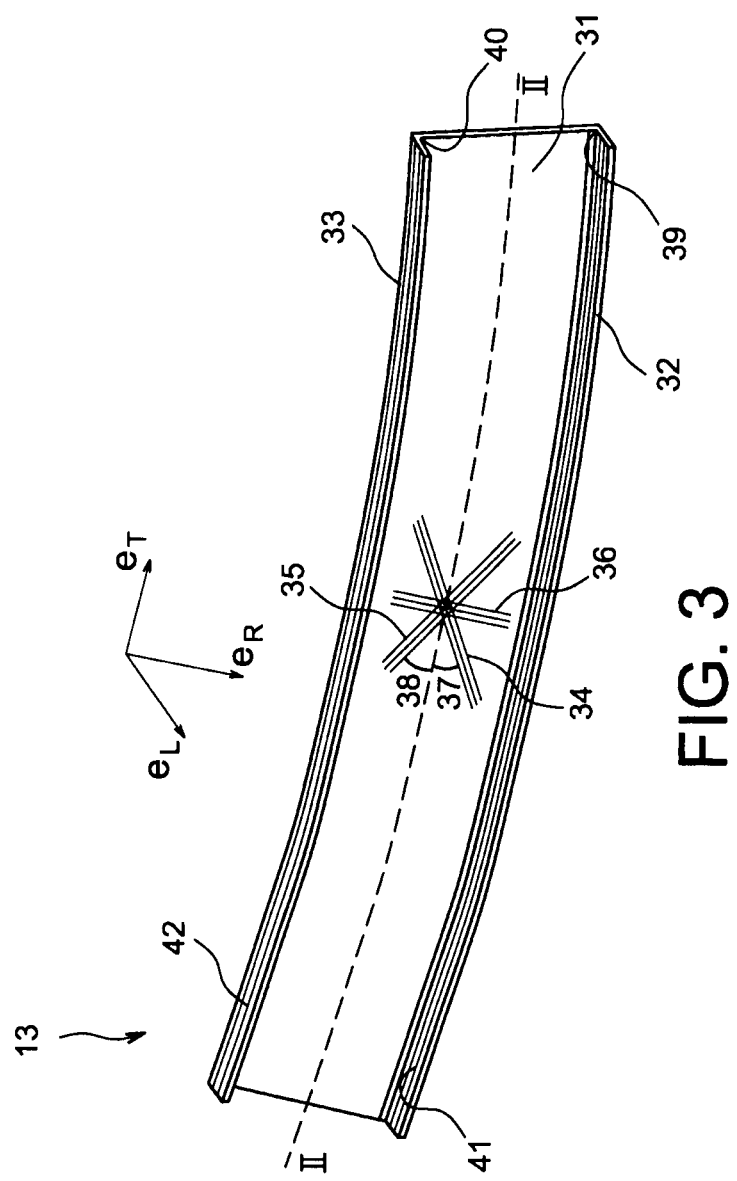
FIG. 3 shows a perspective view of a frame sector according to a preferred embodiment of the invention.

FIG. 3 shows details of a structural frame sector according to a preferred embodiment of the invention. In this embodiment, the structural frame 13 comprises a main part 31, an outer secondary part 32 and an inner secondary part 33. Thus, this embodiment relates to a structural frame with an approximately C-shaped section. In another embodiment not shown, the inner secondary part 33 does not exist and the section of the structural frame 13 is then approximately L-shaped.

The main part 31 of the structural frame 13 is composed of an approximately plane annular-shaped plate for which the median plane is approximately perpendicular to the longitudinal axis I-I of the fuselage. The main part 31 has a curved shape along a median circumferential line II-II. The direction $e_T$ is tangent to the line II-II at all points and thus defines the circumferential axis of the frame 13 at all points along the line II-II.

The structural frame 13 is made from a composite material. It is made using techniques usually used to manufacture this type of part. In particular, these techniques include lay-up techniques that consist of superposing sets of single-directional fibres or fabrics pre-impregnated with resin, and then polymerising the resin.

The main part 31 comprises several sets of single-directional fibres that extend over the entire width of the main part 31, between its inner peripheral edge 40 and its outer peripheral edge 39.

These sets comprise several first sets of single-directional fibres 34 that form a non-zero predetermined angle 37 with the circumferential axis of the frame 13. According to the invention, the angle 37 is within the interval varying from +20 degrees to +40 degrees. It is preferably within the interval varying from +25 degrees to +35 degrees, and is advantageously equal to approximately +30 degrees.

The sets of single-directional fibres in the main part 31 also include several second sets of single-directional fibres 35 forming a predetermined non-zero angle 38 with the circumferential axis of the frame 13. According to the invention, this angle 38 is within the interval varying from −40 degrees to −20 degrees. It is preferably within the interval varying from −35 degrees to −25 degrees and is advantageously equal to approximately −30 degrees.

The sets of fibres 34 and the sets of fibres 35 are uniformly distributed over the thickness of the main part 31, in other words along the I-I axis of the fuselage 10.

In the preferred embodiment of the invention, the single-directional fibres of the first sets of fibres and the second sets of fibres 35 are arranged approximately symmetrically about the circumferential axis of the frame 13, such that the absolute values of the angles 37 and 38 are approximately equal.

Optionally, third sets of single-directional fibres 36 may be arranged in the main part 31 approximately perpendicular to the circumferential axis of the frame 13, in other words along the radial direction $e_R$ of the fuselage. In this case, the first, second and third sets of fibres are uniformly distributed over the thickness of the main part 31, in other words along the I-I axis of the fuselage 10.

In the preferred embodiment shown in FIGS. 2 and 3, the structural frame 13 comprises an outer secondary part 32 connected to an outer peripheral edge 39 of the main part 31. The outer secondary part 32 is in the form of a plate that extends approximately perpendicular to the main part 31, in other words along the longitudinal direction $e_L$ of the fuselage 10, over the entire length of the outer peripheral edge 39.

Optionally, the outer secondary part 32 may comprise single-directional sets of fibres 41 arranged in the circumferential direction of the frame 13. This outer secondary part 32 is used to fix the structural frame 13 to the outer skin 11 of the fuselage 10, for example by riveting. The presence of sets of single-directional fibres 41 arranged in the described direction can increase the stiffness of the structural frame 13.

According to the preferred embodiment of the invention, the structural frame 13 also comprises an inner secondary part 33 connected to an inner peripheral edge 40 of the main part 31 and that extends approximately perpendicular to the main part 31, in other words along the longitudinal direction $e_L$ of the fuselage. The inner secondary part 33 may also comprise sets of single-directional fibres 42 arranged along the circumferential direction of the frame 13. The presence of sets of single-directional fibres 42 arranged in the described direction can increase the stiffness of the structural frame 13.

The sets of single-directional fibres 34, 35 and possibly 36 in the main part 31 are made in the form of a stack of layers or fabrics. When they exist, the sets of single-directional fibres 41, 42 of the secondary parts 32, 33 are made in the form of stacked layers.

Depending on the envisaged application, the nature of the fibres used in the different sets of fibres 34, and possibly 36, 41, 42 of the main part 31 and secondary parts 32, 33 and the nature of the resin in which the fibres are embedded are chosen from among fibres and resins normally used in the field of composite materials. Thus, the fibres may be carbon fibres, glass fibres or aramid fibres and the resin may be a thermosetting resin such as a phenolic or epoxy type resin.

Figure 4:
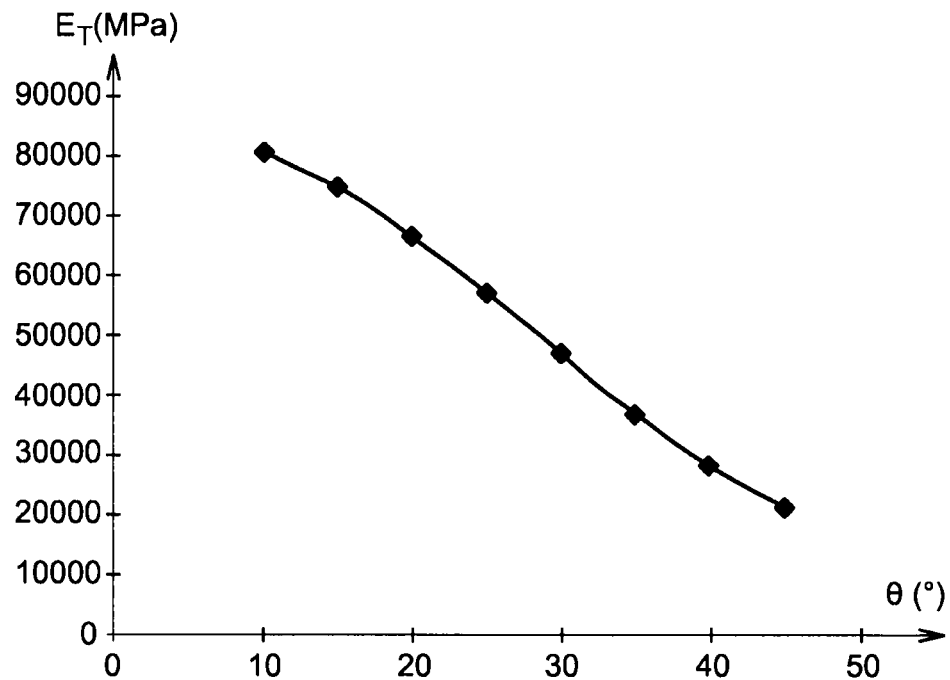
FIG. 4 illustrates the variation of Young's modulus of the main part of the structural frame as a function of the value of the angle formed between sets of single-directional fibres in the main part and the circumferential axis of the frame.
Figure 5:
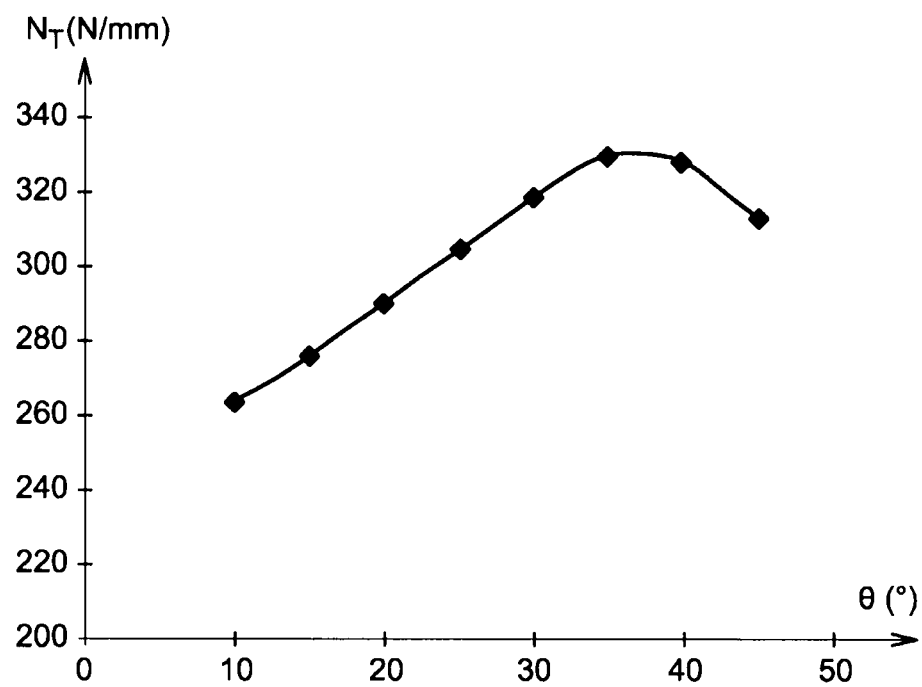
FIG. 5 illustrates the variation in the critical buckling stress of the main part of the structural frame as a function of the value of the angle formed between sets of single-directional fibres in the main part and the circumferential axis of the frame.

FIGS. 4 and 5 show an example of the influence of the orientation of sets of single-directional fibres in the main part 31 of the frame 13 relative to the circumferential axis of the frame 13 on the mechanical performances of the main part 31 of the frame 13. FIG. 4 shows the variation of Young's modulus $E_T$ (in MPa) of the main part 31, measured along the circumferential direction of the frame 13, as a function of the angle θ (in degrees) at which fibres are oriented relative to the circumferential axis of the frame. FIG. 5 shows the variation of the critical buckling stress of the main part 31 $N_T$ (in N/mm) measured along the circumferential direction of the frame 13, as a function of the fibre orientation angle θ (in degrees) relative to the circumferential axis of the frame.

In this example, +θ is equal to angle 37 and −θ is equal to angle 38. This example consists of a plane plate 150 mm long and 70 mm high formed by laying up a series of 8 sets of single-directional fibres oriented at −θ/90°/+θ/−θ/+θ/+θ/90°/−θ. The angle θ varies from 10 degrees to 45 degrees. FIG. 4 shows that Young's modulus $E_T$ increases continuously as the angle θ reduces, which is not surprising. Thus, its value for θ=30° is twice as high as it is for θ=45°. FIG. 5 surprisingly shows that the maximum variation in the critical buckling stress $N_T$ is at about θ=30°. Furthermore, for an angle θ between approximately 25 degrees and 45 degrees, $N_T$ is approximately equal to or greater than its value corresponding to θ=45°. Therefore, it is beneficial to orient the sets of single-directional fibres 34 and 35 in the main part 31 at an angle between +25 degrees and +35 degrees for angle 37 and between −35 degrees and −25 degrees for angle 38. The mechanical performances of the main part 31 of the frame 13 are improved and manufacturing remains simple.

The structural frame 13 conforming with the invention is made using a layup technique known to those skilled in the art. However, note that the outer secondary part 32 and inner secondary part 33 may be made using the technique described in document WO2007/074179, which is different from conventional techniques by which the secondary parts are connected to the main part by the addition of glue films between these elements during polymerisation in the autoclave. In the technique described in document WO2007/074179, the secondary parts of the structural frame correspond to the edges of a monolithic assembly comprising the main part and having the required shape. The secondary parts are obtained by deformation under vacuum at high temperature.

The invention claimed is:

1. A structural frame made from a composite material, designed particularly for an aircraft fuselage, comprising:
    an approximately plane annular main part, the main part including
        first sets of single-directional fibres forming an angle between approximately 25 degrees and 35 degrees from a circumferential axis of the frame, and
        second sets of single-directional fibres forming an angle between approximately −35 degrees and −25 degrees from the circumferential axis of the frame,
        the first and second sets being uniformly distributed over a the thickness of the main part; and
    a secondary part located on an outer peripheral edge around the main part and extending approximately perpendicular to the main part, and the secondary part includes only sets of single-directional fibres arranged approximately in a circumferential direction of the frame.

2. The structural frame made from a composite material according to claim 1, wherein orientations of the first and second sets of single-directional fibres are symmetric about the circumferential axis of the frame.

3. The structural frame made from a composite material according to either of claims 1 and 2, wherein the main part includes first sets of single-directional fibres forming an angle equal to approximately 30 degrees from the circumferential axis of the frame , and second single-directional fibre sets forming an angle equal to approximately −30 degrees from the circumferential axis of the frame.

4. The structural frame made from a composite material according to claim 1, wherein the main part includes third sets of single-directional fibres forming an angle equal to approximately 90 degrees relative to the circumferential axis of the frame.

5. The structural frame made from a composite material according to claim 1, wherein the frame includes a second secondary part arranged on an inner peripheral edge of the main part and that extends approximately perpendicular to the main part.

6. The structural frame made from a composite material according to claim 5, wherein the second secondary part includes sets of single-directional fibres arranged approximately in a circumferential direction of the frame.

7. An aircraft fuselage comprising:
    a framework and an outer skin fixed onto the framework, the framework including at least one structural frame according to claim 1.

8. The structural frame made from a composite material according to claim 1, wherein the main part includes a Young's modulus along a circumferential direction of the frame greater than 30,000 MPa, and the main part includes a critical buckling stress along the circumferential direction of the frame greater than 300 N/mm.

* * * * *